Oct. 16, 1956     C. K. RAYNSFORD ET AL     2,766,621

GROUNDING MEANS FOR A FLOWMETER

Filed April 21, 1952

INVENTORS
CHARLES K. RAYNSFORD
CARL GREEN
ARTHUR R. SOFFEL

BY *Mitchell & Bechert*

ATTORNEYS 2,766,621
Patented Oct. 16, 1956

2,766,621
GROUNDING MEANS FOR A FLOWMETER

Charles K. Raynsford, Summit, Carl Green, Westfield, and Arthur R. Soffel, Ridgewood, N. J., assignors to Vitro Corporation of America, New York, N. Y., a corporation of Delaware Application April 21, 1952, Serial No. 283,329

6 Claims. (Cl. 73—194)

Our invention relates to magnetic-induction flowmeters of the type in which flow is measured by observing the voltage induced across the flow passage in the presence of a magnetic field.

It is an object of the invention to provide an improved construction of the character indicated.

It is another object to provide improved means for reducing spurious signals which could otherwise mask the flow signal in a device of the character indicated.

It is a specific object to provide means for reducing to insubstantial proportions signals (other than the flow signal) which may be developed in the fluid stream, along the fluid path, and transferred to the electrodes.

It is another specific object to provide an improved electrode-supporting means in a device of the character indicated.

Other objects and further features of novelty and invention will be pointed out or will occur to those skilled in the art from a reading of the following specification in conjunction with the accompanying drawings. In said drawings, which show, for illustrative purposes only, preferred forms of the invention:

Briefly stated, our invention contemplates grounding means for the substantial elimination of signals (other than the flow signal) developed in the fluid stream, along the fluid path, and transferred to the electrodes. The chief function of the grounding means is to assure against development of longitudinal electrical currents flowing from end to end of the tube and through the sensing or probing section. In one form, the results are achieved by electrically contacting the fluid at upstream and downstream locations that are spaced from the sensing section, and by electrically interconnecting these contact points; in another form, the entire flow tube is shielded and grounded; and, in the third form, grounding electrodes at the probing section serve to cause longitudinal currents, which would otherwise flow from end to end of the tube, to pass directly to the central ground points (i. e., at the probing section).

Figure 1:
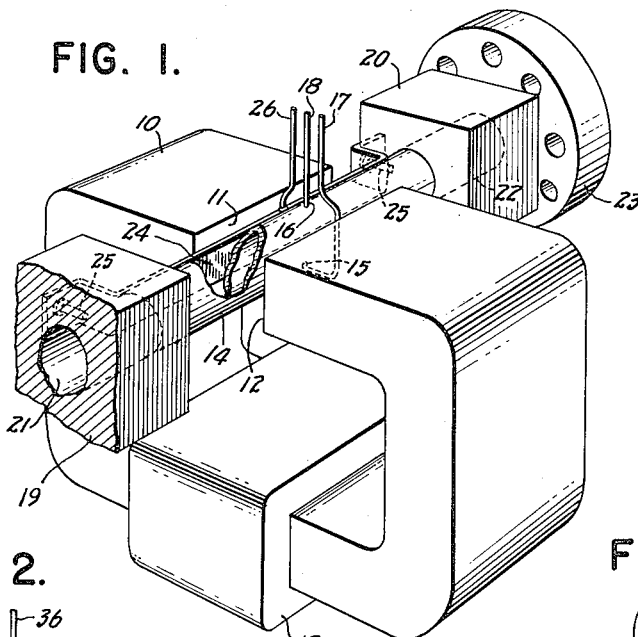
Fig. 1 is a view, in perspective and partly broken away, illustrating parts of a flowmeter incorporating features of the invention.

Referring to Fig. 1 of the drawings, our invention is shown in application to a flowmeter comprising a magnet with a core 10 of substantial cross-section, having opposed poles 11—12, defining an elongated gap; coil means 13 linked to the core 10 may excite the magnet with an alternating current so as to establish a strong alternating flux across the gap between poles 11—12. Located in the gap is a flow tube having an inner wall of non-conducting material, and in the form shown in Fig. 1, the central flow-tube section 14 is a tube of non-conducting material, such as glass or plastic. A pair of opposed sensing electrodes 15—16 may be carried by tube section 14 at a sensing section centrally of the gap, and the electrodes 15—16 are preferably oriented so that a line joining them cuts a maximum number of magnetic lines in the gap. The lead for the lower electrode 15 may be bent around the tube 14 in as small a loop as possible, and preferably in a plane cutting no flux lines, so as to minimize the inducement of unwanted voltages by the pickup loop formed thereby. Both electrode leads 17—18 may then be brought out in a shielded cable for electrical amplification and other processing.

In accordance with the invention, we provide means for so grounding the flow tube as to minimize the development of spurious signals due to longitudinal electrical currents across the probing section. In the form shown in Fig. 1, this result is achieved by exposing the fluid directly to grounding contacts at upstream and downstream locations removed from the probing section; thus, the non-conductive portion 14 of the flow tube may be terminated at each end by electrically conductive blocks 19—20 bored at 21—22 with a diameter to minimize hydraulic turbulence. The blocks 19—20 are rectangular prismatic in form in order to facilitate rigid mounting to a base member (not shown), and we have provided circular flange means, as at 23, for coupling the flowmeter to other more standard pipe fittings. The ground-contact members 19—20 may be electrically interconnected by a ground strap 24 of conclusive but non-magnetic material passing longitudinally through the gap along the outside of the tube 14. We simply bolt the ends of the strap 24 to the blocks 19—20, as suggested at 25. As explained more fully in the copending patent application of A. R. Soffel, Serial No. 283,328, filed April 21, 1952, the grounding means is preferably tied to a neutral point in the amplifier circuitry, which is not shown herein; for such purposes, a ground lead 26 may be brought from the strap 24, and preferably strictly in a plane perpendicular to the flow tube and parallel to the lines of magnetic flux, as shown.

Figure 2:
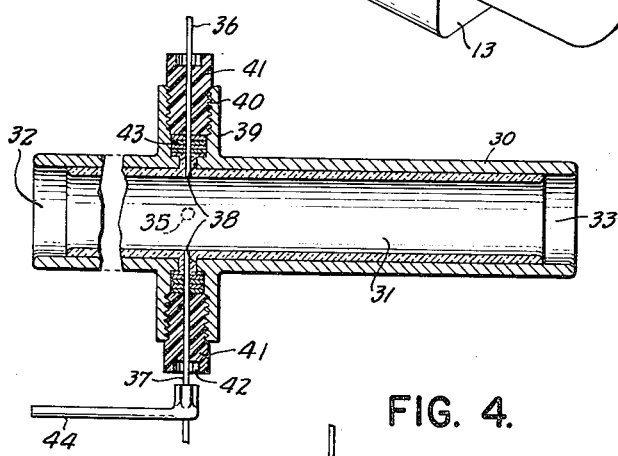
Fig. 2 is a longitudinal sectional view of an alternative flow-tube construction for use in the combination of Fig. 1.
Figure 3:
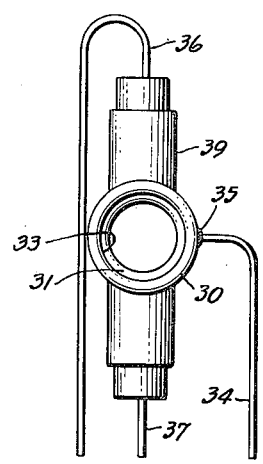
Fig. 3 is a right-end view of the flow tube of Fig. 2.

In Fig. 2, we show a modified flow-tube construction which may replace that described in Fig. 1 and which may, therefore, be oriented in the gap between pole pieces 11—12. In the construction of Fig. 2, the flow-tube comprises an elongated member 30 of electrically conducting non-magnetic material, such as a tube of copper. The inner wall of the tube may be rendered non-conductive by the application of a coating 31 of non-conductive material, such as a plastic or a vitreous ceramic. Electrical contact with the fluid at upstream and downstream locations may be effected by terminating the coating 31 short of longitudinal ends of the tube 30, so as to expose circumferentially extending fluid-contact areas 32—33 at either end of the tube. The tube 30 itself thus provides a means of electrically interconnecting the two contact portions 32—33, and the ground lead 34 may simply be soldered, as suggested at 35, to the tube 30 at the probing section.

The sensing electrodes should be exposed directly to the fluid through the insulating layer 31, and we illustrate in Fig. 2 a means for removable support of the electrodes 36—37 in this relation. To accommodate the electrodes, the tube 30 may be provided at the probing section with enlarged radial openings 38; and, when the tube 30 is coated with the insulating material, the insulating material may be allowed to flow into the openings 38, thus coating the openings 38. The holes 38 will then be plugged with insulating material, and the plugs may be drilled for close-fitting accommodation of electrodes 36—37.

For the more rigid support of the electrodes 36—37, we provide packing gland means at each electrode location. In the form shown, the gland means comprises a sleeve member or bushing 39, secured to or formed as a part of the tube 30, and having a bore concentric with the eletcrode hole in each of the openings 38. The sleeve 39 may be threaded at 40 to accommodate a packing screw 41, which is shown to have a drive socket 42 of the so-called "Allen"-head variety. The gland-packing may comprise yieldable insulating means, and we prefer a stacked plurality of insulating washers 43 fitting the bore of sleeve 39 and frictionally accommodating the electrode (which may be a rod end); the coating 31 applied to tube 30 preferably extends through openings 38 and over the outside of tube 30 within sleeve 39, so that the washers 43 may seat upon a layer of the insulating coating 31 (as shown). The gland screw 41 may be provided with a central bore of a size freely to clear the electrode, and in order to insulate the screw 41 from the electrode, either the electrode may be coated with an insulating material (as shown) or both these precautions may be taken. The assembly may be secured by employment of a special wrench 44, having a bored drive-head to permit application over the exposed end of the electrode for engagement with the drive socket 42 of the gland screw 41. We have found that upon take-up of the gland screw, the washer-type packing 43 provides an effective fluid seal without mechanically overstressing the parts.

Figure 4:
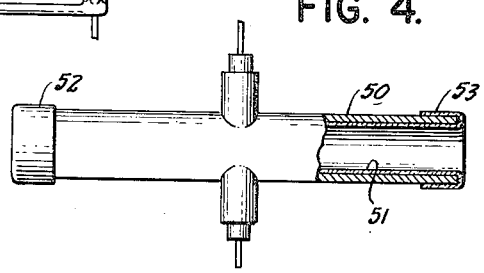
Fig. 4 is a partly sectionalized view of a further alternative flow tube.

In Fig. 4, we illustrate a slightly modified form of the construction of Fig. 2, wherein the tubular conductive member 50 is treated with a coating 51 of insulating material which extends the full length of the conductive tube 50 and which even overlaps the outer ends of the tube 50, as suggested at 52—53. It will be appreciated that, in the construction of Fig. 4, the grounded tube 50 serves as an electrical shield against inducement of undesired voltages.

Figure 5:
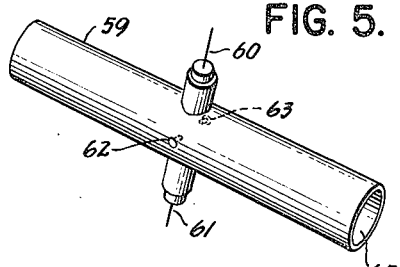
Fig. 5 is a simplified perspective view of still another flow-tube construction.
Figure 6:
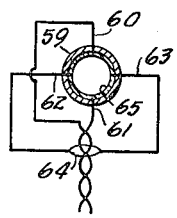
Fig. 6 schematically indicates electrical connections to the flow tube of Fig. 5.

In Fig. 5, we illustrate a further embodiment, employing a greater plurality of electrodes at the sensing section. We show two electrodes 60—61, which may be as described in the previous arrangements, for sensing the flow-induced voltage to be observed. The additional electrodes 62—63 may be of the same form as the electrodes 60—61 (so as to establish electrical contact with the fluid), but these additional electrodes are both grounded, as suggested in Fig. 6 by connection to the shield means 64 for the leads to the sensing electrodes 60—61. If the flow tube 59 of Fig. 5 is of the non-conductive variety, as is the case at 14 in Fig. 1, then the electrodes 62—63 may be simply fused or otherwise set in the wall of the tube, in the manner employed in Fig. 1. However, in Fig. 5, we illustrate the employment of the general construction shown in Figs. 2 and 4, wherein the flow tube 59 comprises an outer conductive tube with an inner coating 65 of insulating material. All electrode leads 60—61 may be brought out in the manner described in Fig. 2 (that is, through an aperture and packing-gland means), but we show electrodes 62—63 as short rivets connected (as by solder) to the outer conductive member 59 and projecting through the insulating layer, preferably flush with the inner wall of the layer 65, for direct electrical contact with the fluid at the probing section.

In operation, it will be appreciated that regardless of whether the tube 59 is non-conductive, as at 14 in Fig. 1, or is conductive, as at 30 in Fig. 2, the grounding electrodes 62—63 will serve to permit any longitudinal currents that would otherwise flow from end to end of the tube, to flow to these ground points 62—63, instead of passing from one end of the tube to the other. By avoiding the passage of currents across the probing section, the inducement of unwanted signals (due to this cause) is avoided in the electrode loop. In connection with the arrangement of Fig. 5, wherein the tube 59 is of conducting material, it will be seen that a shielding function is provided in addition to grounding at the probing section, thus even further reducing the inducement of unwanted signals due to longitudinal currents.

It will be seen that we have described relatively simple constructions for assuring against the developement of undesired signals due to longitudinal electrical currents in a flow tube, no matter how these currents may have originated. By reducing the magnitude of undesired signals due to such sources, we have made it possible to improve the signal-to-noise ratio in the sensing circuit. Quite aside from the desirable electrical properties of our grounding means, we have shown mechanically rugged structures which in themselves tend to avoid the inducement of spurious signals due to mechanical vibration.

While we have described the invention in detail for the preferred forms shown, it will be understood that modifications may be made within the scope of the invention as defined in the claims which follow.

We claim:

1. In a flowmeter, a magnet with a core having a gap, a flow tube extending longitudinally through said gap and having an internal passage with a non-conductive inner wall extending through said gap, elongated conductive means substantially coextensive with said tube and exterior to said inner wall, four electrodes angularly spaced about a probing section in said gap, and connection means for said electrodes comprising a grounded shielded cable and including two insulated conductors connected to one pair of opposed electrodes, and electrical connections from the shield of said cable to both electrodes of the other pair and to said elongated conductive means.

2. A flowmeter according to claim 1, in which said flow tube is of electrically conductive material, said inner wall being a layer of insulating material in the bore of said tube, both electrodes of said second pair being electrically connected to the conductive part of said flow tube.

3. As an article of manufacture, a flow tube for a magnetic induction flowmeter, comprising an electrically conductive tubular member with four electrode openings at equally angularly spaced locations at a sensing section, a substantially continuous layer of insulating material in the bore of said tubular member and substantially filling said electrode openings, electrode leads passing through said insulating material in a first opposed two of said openings at a sensing section and exposed for direct electrical contact with fluid contained by said insulating layer, the other two of said electrodes being in electrical contact with said conducting member and in electrical conducting relation with the fluid contained by said insulating layer at locations spaced from said first electrodes.

4. In a flowmeter, a magnet having a core with a gap therein, a flow tube comprising a non-conductive inner wall portion in said gap and extending beyond both longitudinal ends of said gap, opposed sensing electrodes passing through said wall portion in said gap and exposed for internal contact with a fluid in said wall portion, electrically conductive terminal members each having electrically conductive flow passages connected to the ends of said non-conductive wall section, whereby direct electrical contact may be made with fluid in said tube at locations spaced upstream and downstream from said electrodes, and an electrically conducting strap secured to and interconnecting both conducting members and extending parallel to said passage and through said gap.

5. In a flowmeter, a magnet having a core with a gap therein, a flow tube comprising a non-conductive wall portion in said gap and extending beyond both longitudinal ends of said gap, opposed sensing electrodes passing through said wall portion in said gap and exposed for internal contact with a fluid in said wall portion, said electrodes being flush with the inner surface of said wall portion, electrically conductive terminal means at each end of said tube, each said terminal means having a circumferentially continuous conductive bore communicating with said non-conductive wall portion, whereby direct electrical contact may be made with fluid in said tube at locations spaced upstream and downstream from said electrodes, and a direct electrically conducting connection interconnecting both said terminal means and extending parallel to said tube and through said gap.

6. In a flowmeter, a magnet having a core with a gap therein, a flow tube in said gap, said tube comprising an electrically conductive non-magnetic tubular member with a plurality of enlarged electrode openings at angularly spaced locations at a sensing section within said gap, a layer of insulating material in the bore of said tubular member and lining said electrode openings and extending beyond both limits of said gap, means electrically conductively exposing longitudinally spaced parts of said conductive member to fluid in said tube at locations upstream and downstream from said sensing section, said locations being spaced on opposite sides of said gap, and electrodes including portions passing through the insulating material in said openings and exposed for direct electrical contact with fluid contained by said insulating layer, the ends of said electrodes exposed within said bore being flush with the inner surface of said layer of insulating material.

References Cited in the file of this patent

UNITED STATES PATENTS

| | | |
|---|---|---|
| 1,156,660 | Berg | Oct. 12, 1915 |
| 2,491,445 | Cunningham et al. | Dec. 13, 1949 |
| 2,515,221 | Henning | July 18, 1950 |
| 2,685,796 | Romanowski et al. | Aug. 10, 1954 |

OTHER REFERENCES

An Alternating Field Induction Flowmeter of High Sensitivity, A. Kolin, The Review of Scientific Instruments, vol. 16, No. 5, May 1945, pp. 109–116.

An Electromagnetic Flowmeter for Transient Flow Studies, J. S. Arnold, The Review of Scientific Instruments, vol. 22, No. 1, January 1951, pp. 43–47.

An Induction Flowmeter Design Suitable for Radioactive Liquids, W. G. James, The Review of Scientific Instruments, vol. 22, No. 12, December 1951, pp. 989–1002.